Patented Dec. 4, 1951

2,577,432

UNITED STATES PATENT OFFICE 2,577,432

POLYETHYLENE POLYAMINE ACTIVATED ORGANIC PEROXIDE CATALYZED SYNTHETIC RUBBER EMULSION POLYMERIZATIONS

Raoul L. Provost, Cheshire, Conn., assignor to United States Rubber Company, New York, N. Y., a corporation of New Jersey No Drawing. Application May 23, 1950, Serial No. 163,784

12 Claims. (Cl. 260—84.7)

This invention relates to improvements in polyethylene polyamine activated organic peroxide catalyzed synthetic rubber emulsion polymerizations, or so-called peroxamine polymerizations.

Increasing the reaction rate of peroxide catalyzed synthetic rubber emulsion polymerizations by including in the polymerization recipe a reduction activator, such as a ferrous salt, is well known. Residual iron salts in the recovered rubber, however, cause discoloration of articles manufactured therefrom. There are other disadvantages, such as the necessity for carefully ageing the activating solution when reducing sugars are included with the ferrous salts. Polyethylene polyamines have been used as activators for organic peroxide catalyzed emulsion polymerizations of so-called iron-free polymerization recipes, as where iron salts are not added as such to the emulsion polymerization system, i. e. except, of course, as they might occur as impurities in other added materials. Such peroxamine polymerizations are generally carried out at temperatures below 50° F. because of the rapid reaction rate resulting from the rapid formation of free radicals by the action of the polyethylene polyamine on the organic peroxide. However, there is a tendency for reproducibility to be poor, and usually there results a very rapid rate of reaction in the first few hours of polymerization with a subsequent slowing down and sometimes total cessation of the reaction before the desired conversion of monomers into polymer has been attained. The rapid initial reaction rate is also undesirable because there then results an abnormal heat load on the cooling system through which the heat of polymerization is removed. The load is often momentarily greater than the capacity of the cooling equipment and loss of batch temperature control results which may make the polymer unsuitable for use.

By the present invention, I have been able to control the rapid initial reaction rate in peroxamine polymerizations without appreciably increasing the overall time for a given conversion of monomers to synthetic rubber, and to prevent too rapid consumption of the peroxide catalyst which leads to slowing down or cessation of reaction before the desired conversion is attained.

In carrying out the present invention, the synthetic rubber-producing polymerizable monomers are polymerized in an alkaline aqueous emulsion (pH from 9 to 12 or higher) in the presence of an organic peroxide catalyst, a polyethylene polyamine activator and, in addition, an alkali tartrate or citrate. The term "alkali" as applied to the tartrates and citrates is used herein in its conventional meaning as including alkali-metal and ammonium tartrates and citrates, but excluding alkaline-earth and other polyvalent metal tartrates and citrates. The amount of alkali tartrate or citrate in the emulsion will be from 0.001 to .1 part per 100 parts of polymerizable monomers. All parts and percentages referred to herein are by weight. The catalyst may be a conventional organic peroxide catalyst, for example, cumene hydroperoxide, tertiary butyl hydroperoxide, diisopropylbenzene hydroperoxide, cyclohexylbenzene hydroperoxide, cymene hydroperoxide, etc. The amount of organic peroxide catalyst will generally be from 0.05 to 0.5 part per 100 parts of polymerizable monomers. The polyethylene polyamine activators for the organic peroxide catalyst are well known materials and may be one or a mixture of polyethylene polyamines. Effective activators are diethylene triamine, triethylene tetraamine, tetraethylene pentamine, and the higher polyethylene polyamines up to mixtures of high molecular weight polyethylene polyamines having an average molecular weight of over a thousand, as in the still bottom from the distillation recovery of the lower polyethylene polyamines (and ethylene diamine) from the autoclave reaction product of ethylene dichloride and ammonia, which has a molecular weight around 1200. The amount of polyethylene polyamine will generally be from 0.01 to 0.5 part per 100 parts of polymerizable monomers. Conventional polymerization regulators such as aliphatic mercaptans having 6 to 18 carbon atoms ($C_6$ to $C_{12}$), and aromatic mercaptans may be used to regulate the polymer chain length. The emulsifying agents for the polymerizable monomers may be the conventional water-soluble soaps of soap-forming monocarboxylic acids, such as the alkali salts of aliphatic acids having 8 to 24 carbon atoms, rosin acids, or naphthenic acids, or other anionic surface-active emulsifying and dispersing agents. The polyethylene polyamines activate the organic peroxide catalyst in alkaline medium. Alkali soaps and hydroxides will render the aqueous emulsion alkaline as in conventional polymerizations. The polymerization is allowed to take place at the desired temperature until the desired conversion of monomers to synthetic rubber, generally 50% to 85% conversion is reached.

Iron-free peroxyamine polymerization recipes are primarily used in commercial so-called cold GR–S polymerizations at 41° F., and the present invention is particularly adapted to such cold GR–S polymerizations, but may be used with GR–S and other synthetic rubber polymerizations at various temperatures, as from 32° F. to 150° F. After conversion of the desired amount of polymerizable monomers to synthetic rubber, the polymerization is stopped by the addition of a so-called shortstopping agent which prohibits further polymerization of the monomers during their removal. Hydroquinone, di-tert-butyl hydroquinone, and dinitrochlorobenzene are common shortstopping agents. After addition of the shortstopping agent, the unreacted residual polymerizable monomers are removed from a synthetic rubber latex, as by venting off monomers, e. g. butadiene-1,3, which are gaseous at atmospheric pressure, and by steam distilling under reduced pressure the residual higher boiling or liquid monomers, e. g., styrene, and the thus recovered polymerizable monomers may be utilized in subsequent emulsion polymerizations. If desired, the synthetic rubber latex may be coagulated by salt and/or acid in known manner.

The polymerizable material in the preparation of the synthetic rubber latex may be one or a mixture of butadienes-1,3, for example, butadiene-1,3, methyl-2-butadiene-1,3 (isoprene), chloro-2-butadiene-1,3 (chloroprene), piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electronegative group, that is, a group which substantially increases the electrical dissymmetry or polar character of the molecule. Examples of such monoolefines containing a terminal methylene ($CH_2=C<$) group which are copolymerizable with butadienes-1,3, are aryl olefines, such as styrene, vinyl naphthylene, alpha methyl styrene, parachloro styrene, dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether, methyl vinyl ketone; vinylidene chloride.

The following example is illustrative of the present invention:

Three reactors were charged with a conventional GR–S peroxamine polymerization formulation as follows: 71 parts of butadiene-1,3, 39 parts of styrene, 4.7 parts of the sodium soap of disproportionated rosin acid (emulsifier), 0.2 part of sodium hydroxide, 0.05 part of the condensation product of formaldehyde and sodium naphthalene sulfonate (additional anionic emulsifying and dispersing agent), 0.12 part of tertiary dodecyl mercaptan (polymerization modifier or regulator), 0.15 part of diisopropylbenzene hydroperoxide (catalyst), 0.08 part of tetraethylene pentamine, and 200 parts of water (including water added to the reactor as such and the water used to make up the various emulsions and solutions of the added reagents). Nothing further was added to the charge in one of the reactors (control). Potassium citrate 0.0065 part, was added to the charge in the second reactor. Sodium potassium tartrate, 0.0044 part, was added to the charge in the third reactor.

The emulsions of polymerizable monomers were polymerized at 41° F. under agitation until 60 percent conversion of polymerizable monomers to synthetic rubber. The 60 percent conversion of the control batch took 17 hours. The 60 percent conversion of the batch containing the potassium citrate took 17 hours. The 60 percent conversion of the batch containing the sodium potassium tartrate took 20 hours. However, the conversion of monomers to polymer in the control batch was exceedingly rapid in the early stages of the polymerization with consequent evolution of correspondingly large amounts of heat, whereas the conversion of monomers to polymer in the batches to which the potassium citrate and sodium potassium tartrate had been added was slower in the earlier stages of the polymerization but with substantially the same over-all time for the desired conversion of 60 percent of the original polymerizable monomers to polymer. The rates of conversion of the three batches is shown in the following table, batch A being the control, batch B containing the potassium citrate, and batch C containing the sodium potassium tartrate:

| Time | Conversion (Per Cent) | | |
|---|---|---|---|
| | A | B | C |
| 3 hours | 23 | 15 | 12 |
| 6 hours | 37 | 26 | 23 |
| 9 hours | 45 | 35 | 32 |
| 12 hours | 54 | 45 | 40 |
| 15 hours | 58 | 53 | 46 |

As shown in the above table, the addition of a small amount of an alkali citrate or tartrate effectively controlled and evened out the rate of polymerization.

In view of the many changes and modifications that may be made without departing from the principles underlying the invention, reference should be made to the appended claims for an understanding of the scope of the protection afforded the invention.

Having thus described my invention what I claim and desire to protect by Letters Patent is:

1. In the process of emulsion polymerizing in alkaline medium an iron-free synthetic rubber polymerization recipe comprising synthetic rubber-forming monomers selected from the group consisting of butadienes-1,3 and mixtures of butadienes-1,3 with compounds which contain a single $CH_2=C<$ group and are copolymerizable with butadienes-1,3, water, emulsifying agent, organic peroxide catalyst, and polyethylene polyamine activator, the step which comprises carrying out the polymerization in the presence of 0.001 to 0.1 part per 100 parts of polymerizable monomers of salt selected from the group consisting of alkali tartrates and alkali citrates.

2. In the process of emulsion polymerizing in alkaline medium an iron-free synthetic rubber polymerization recipe comprising synthetic rubber-forming monomers selected from the group consisting of butadienes-1,3 and mixtures of butadienes-1,3 with compounds which contain a single $CH_2=C<$ group and are copolymerizable with butadienes-1,3, water, emulsifying agent, organic peroxide catalyst, and polyethylene polyamine activator, the step which comprises carrying out the polymerization in the presence of 0.001 to 0.1 part of alkali-metal tartrate per 100 parts of polymerizable monomers.

3. In the process of emulsion polymerizing in alkaline medium an iron-free synthetic rubber polymerization recipe comprising synthetic rubber-forming monomers selected from the group consisting of butadienes-1,3 and mixtures of butadienes-1,3 with compounds which contain a single $CH_2=C<$ group and are copolymerizable with butadienes-1,3, water, emulsifying agent, organic peroxide catalyst, and polyethylene polyamine activator, the step which comprises carrying out the polymerization in the presence of 0.001 to 0.1 part of alkali-metal citrate per 100 parts of polymerizable monomers.

4. The process which comprises polymerizing an alkaline aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, and containing emulsifying agent, organic peroxide catalyst and polyethylene polyamine activator, said emulsion containing iron salts only as impurities and containing 0.001 to 0.1 part per 100 parts of polymerizable monomers of salt selected from the group consisting of alkali tartrates and alkali citrates.

5. The process which comprises polymerizing an alkaline aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, and containing emulsifying agent, organic peroxide catalyst and polyethylene polyamine activator, said emulsion containing iron salts only as impurities and containing 0.001 to 0.1 part of alkali-metal tartrate per 100 parts of polymerizable monomers.

6. The process which comprises polymerizing an alkaline aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, and containing emulsifying agent, organic peroxide catalyst and polyethylene polyamine activator, said emulsion containing iron salts only as impurities and containing 0.001 to 0.1 part of alkali-metal citrate per 100 parts of polymerizable monomers.

7. In the process of emulsion polymerizing in alkaline medium an iron-free synthetic rubber polymerization recipe comprising a mixture of butadiene-1,3 and styrene, water, emulsifying agent, organic peroxide catalyst, and polyethylene polyamine activator, the step which comprises carrying out the polymerization in the presence of 0.001 to 0.1 part per 100 parts of polymerizable monomers of salt selected from the group consisting of alkali tartrates and alkali citrates.

8. In the process of emulsion polymerizing in alkaline medium an iron-free synthetic rubber polymerization recipe comprising a mixture of butadiene-1,3 and styrene, water, emulsifying agent, organic peroxide catalyst, and polyethylene polyamine activator, the step which comprises carrying out the polymerization in the presence of 0.001 to 0.1 part of alkali-metal tartrate per 100 parts of polymerizable monomers.

9. In the process of emulsion polymerizing in alkaline medium an iron-free synthetic rubber polymerization recipe comprising a mixture of butadiene-1,3 and styrene, water, emulsifying agent, organic peroxide catalyst, and polyethylene polyamine activator, the step which comprises carrying out the polymerization in the presence of 0.001 to 0.1 part of alkali-metal citrate per 100 parts of polymerizable monomers.

10. The process which comprises polymerizing an alkaline aqueous emulsion of a mixture of butadiene-1,3 and styrene containing emulsifying agent, organic peroxide catalyst and polyethylene polyamine activator, said emulsion containing iron salts only as impurities and containing 0.001 to 0.1 part per 100 parts of polymerizable monomers of salt selected from the group consisting of alkali tartrates and alkali citrates.

11. The process which comprises polymerizing an alkaline aqueous emulsion of a mixture of butadiene-1,3 and styrene, containing emulsifying agent, organic peroxide catalyst and polyethylene polyamine activator, said emulsion containing iron salts only as impurities and containing 0.001 to 0.1 part of alkali-metal tartrate per 100 parts of polymerizable monomers.

12. The process which comprises polymerizing an alkaline aqueous emulsion of a mixture of butadiene-1,3 and styrene, containing emulsifying agent, organic peroxide catalyst and polyethylene polyamine activator, said emulsion containing iron salts only as impurities and containing 0.001 to 0.1 part of alkali-metal citrate per 100 parts of polymerizable monomers.

RAOUL L. PROVOST.

REFERENCES CITED

The following references are of record in the file of this patent:

UNITED STATES PATENTS

| Number | Name | Date |
|---|---|---|
| 2,375,140 | Semon | May 1, 1945 |

OTHER REFERENCES

Whitby et al., Abstract Rubber Age, vol. 65, No. 5, August 1949, p. 545.

Whitby et al. (2), Ind. & Eng. Chem., vol. 42, No. 3, March 1950, pp. 445 to 456.